United States Patent [19]

Daugherty et al.

[11] 3,902,668
[45] Sept. 2, 1975

[54] CENTER-PIVOT IRRIGATION SYSTEM

[75] Inventors: Robert B. Daugherty; William C. Eaton, both of Omaha, Nebr.

[73] Assignee: Valmont Industries, Inc., Valley, Nebr.

[22] Filed: Mar. 29, 1974

[21] Appl. No.: 456,009

[52] U.S. Cl. ............... 239/177; 137/344; 180/98; 239/184; 239/212
[51] Int. Cl.² ........................................ B05B 3/12
[58] Field of Search ...... 239/177, 189, 212, DIG. 1; 137/344; 180/98

[56] References Cited
UNITED STATES PATENTS

| | | | |
|---|---|---|---|
| 3,606,933 | 9/1971 | Rushing et al. | 180/98 |
| 3,628,729 | 12/1971 | Thomas | 239/177 |
| 3,651,882 | 3/1972 | Loesch | 239/177 X |
| 3,797,517 | 3/1974 | Kircher et al. | 239/212 X |

Primary Examiner—M. Henson Wood, Jr.
Assistant Examiner—Randolph A. Reese
Attorney, Agent, or Firm—Kinzer, Plyer, Dorn & McEachran

[57] ABSTRACT

A center-pivot irrigation system for large area irrigation including an elongated main water conduit, mounted on an extending between a series of self-propelled support towers and projecting radially outwardly from a central pivot, for irrigating a circular area. A boom, including an auxiliary water conduit supported upon at least one boom support tower, is pivotally connected to the end of the main conduit opposite the central pivot; the boom is guided along a non-circular path by sensing means field-coupled to an electrical conductor defining a path related to the area desired to be irrigated, causing the boom to pivot relative to the end of the main conduit and thereby modifying the configuration of the irrigated area from a circular configuration to other desired configurations.

11 Claims, 7 Drawing Figures

CENTER-PIVOT IRRIGATION SYSTEM

BACKGROUND OF THE INVENTION

This system relates generally to a center-pivot irrigation system and more particularly concerns a boom comprising an auxiliary water conduit which is controlled from a buried electrical conductor; the conductor is field-coupled to a sensing means which controls the direction of movement of the boom and its auxiliary water conduit.

Center-pivot irrigation systems have been used in many areas where irrigation is either necessary or desired to increase crop production. Such center-pivot irrigation systems have excelled, due to their simplicity of operation and convenient one-pivot water supply, and have yielded quite substantial increases in crop production. A problem in the past has been the fact that the center pivot system irrigates a circular area, and it is difficult to nest such circular watering systems to cover the entire area of a farm. A common example is a square field watered by a circular sprinkler system. Since each sprinkler system usually covers approximately a quarter section of land, the amount of space not covered is sizable.

Another problem related to these systems is the unavoidable obstructions which occur in various fields. Examples of such obstructions are electric transmission line towers or farm buildings. Other examples may be irregular fences, trees, rocks or other terrain features.

It is an object of this invention to provide a means of watering closer to the edges of a square field and also a means for watering more area in a field with obstructions.

Another object is to provide a means of controlling such sprinkling systems that is simple and dependable. It is highly desirable that the control be quite accurate, due to the extended usage and the frequent periods of lack of inspection of such irrigation devices. It is desired to minimize or eliminate as much labor time as possible in utilizing such devices.

A more detailed object is to make the use of the extension boom fail-safe in the event of a control failure.

SUMMARY OF THE INVENTION

Accordingly, the invention relates to a center-pivot irrigation system for use with a water source connected to a central water supply point and an electrical conductor defining a path related to the configuration of the area to be irrigated. The system includes an elongated main water conduit communicating with the water source and projecting radially outwardly from the central point, the main water conduit being mounted on and extending between a series of propelled support towers located at spaced points along the main conduit and pivotally movable around the central point. A boom comprising an auxiliary water conduit communicates with the main water conduit, being supported on at least one boom support tower and pivotally connected to the end of the main water conduit opposite the central water point supply. A plurality of sprinkler heads communicate with and are located at spaced points along the main water conduit and the auxiliary water conduit. Sensing means are field-coupled to the electrical conductor, and control means are coupled to the sensing means and to the boom support tower for guiding the boom support tower and the boom along the path defined by the electrical conductor to thereby determine the configuration of the irrigated area.

DETAILED DESCRIPTION OF THE INVENTION

Figure 1:
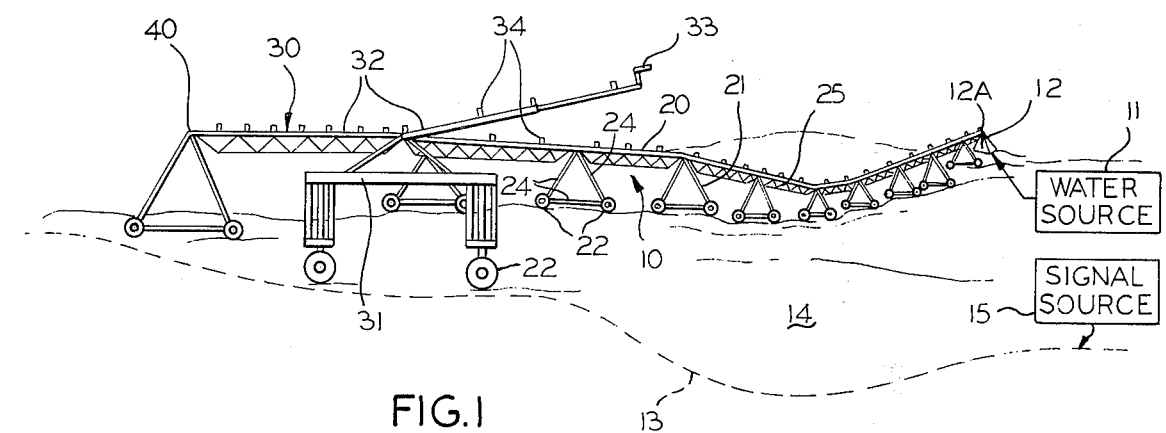
FIG. 1 is a perspective view of a center-pivot irrigation system constructed in accordance with one embodiment of the present invention and shown irrigating a field.

FIG. 1 shows a center-pivot irrigation system 10 constructed in accordance with one embodiment of the present invention. Irrigation system 10 is utilized with a water source 11 which communicates with a central water supply point 12. System 10 incorporates an electrical conductor 13 buried in a field 14 and coupled to a signal source 15. Irrigation system 10 further includes an elongated main water conduit 20 which communicates with central water supply point 12 and water source 11; conduit 20 is supported by and extends between a plurality of self-propelled support towers 21. Each of the support towers includes wheels 22 driven by motors 23 (see FIG. 3) and a support framework 24 which supports main water conduit 20. Motors 23, in the illustrated system, are electric motors; however, water drive motors, other hydraulic motors, or even pneumatic motors could be employed. Bridging supports 25 are utilized to rigidify main water conduit 20 and to minimize the number of support towers 21.

Main water conduit 20 is connected to central water supply point 12 by a rotatable elbow 12A and main conduit 20 is pivotally rotatable around central point 12. Central supply point 12 is firmly anchored in place by a framework 12B and force on central point 12 is minimized by driving the support towers 21 in a direction essentially perpendicular to or on an arc of a radius extending from central point 12. Main water conduit 20 comprises various segments 20A, 20B, 20C, etc. up to the end segment 20J (see FIG. 2). These segments extend from central point 12 to support towers 21A, 21B, 21C etc. up to the end support tower 21J. The essentially rigid segments are flexibly connected to each adjacent segment at the support towers. The connections of all segments 20A–J will essentially provide a linear conduit 20, as seen in FIG. 2.

A boom 30 is attached to the end of main water conduit 20 at a joint 40 opposite the central point 12. Boom 30 includes a support tower 31 and an auxiliary water conduit 32 which communicates with main water conduit 20. Although only one support tower 31 is shown, as many support towers as desired can be included, depending on the length of the boom. Boom 30 will preferably be about 20 percent of the length of main water conduit 20; however, according to the desired application, the boom can be as long as desired. The boom 30 may be constructed in segments similar to the main conduit 20. An end gun 33 is preferably connected at the end of auxiliary water conduit 32 opposite joint 40. End gun 33 communicates with auxiliary water conduit 32. The main and auxiliary conduits (20 and 32) include a plurality of sprinklers 34 to provide irrigating water. End gun 33 provides for watering beyond the outermost extension of any of the physical parts of irrigation system 10 by spraying water away from the outer end of auxiliary conduit 32.

When more than one boom support tower is used, the boom support towers between the end boom support tower 31 and joint 40 may be followers or steerable as support tower 31. Boom 30 is joined to the main water conduit at joint 40 and can pivot around this point. Thus, main water conduit 20 and auxiliary conduit 32 are pivotally connected at joint 40.

Figure 2:
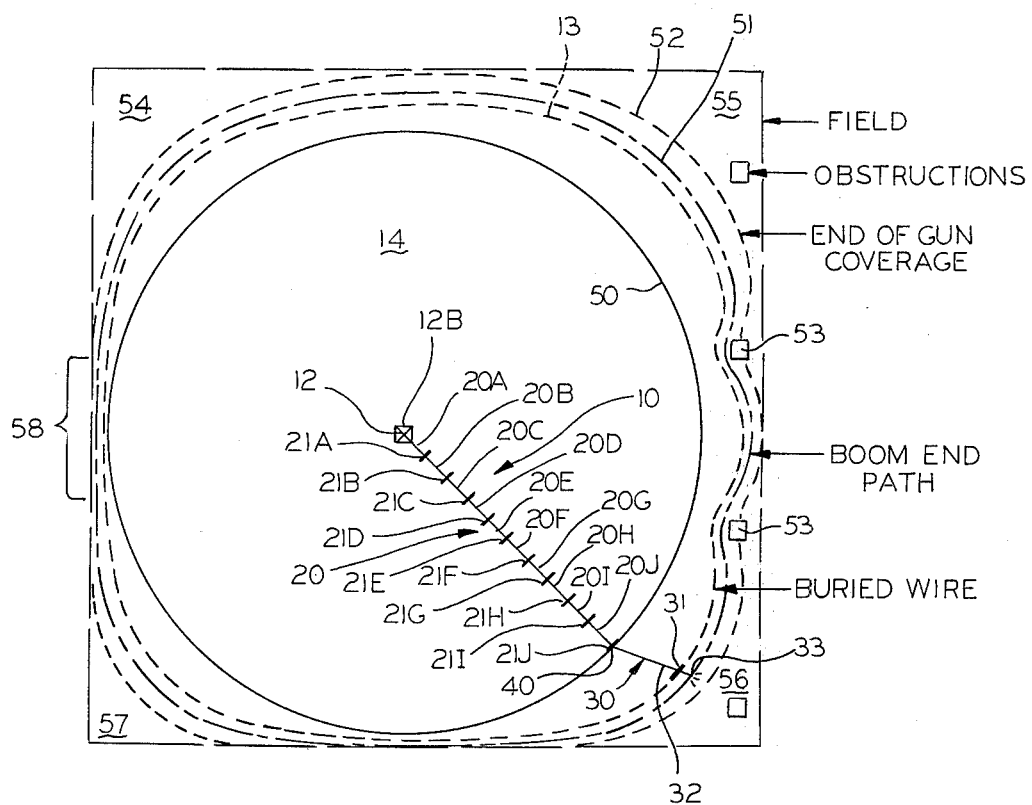
FIG. 2 is a schematic plan view of a field with a center-pivot irrigating system utilizing an embodiment of the present invention, showing the area irrigated.

Turning to the schematic in FIG. 2, main water conduit 20 will essentially irrigate a circular area bounded by line 50. The boom support tower 31 will be controlled so as to follow buried wire 13, which will cause boom 30 to follow a path as defined by line 51. By controlling end gun 33, an additional area can be covered as shown by line 52. The total amount of area which will be effectively irrigated by a device incorporating embodiments of the present invention is shown by the area within line 52. This irrigated area is modified to avoid obstructions 53 and extends well into corners 54, 55, 56 and 57.

Movement of main conduit 20 is accomplished by motors 23 on each wheel 22. The motor 23 and wheels 22 of the boom support tower 31 may be essentially similar to the propulsion equipment used for the main conduit tower 21. While electric motors 23 and their control will be explained, it will be apparent that any type of motor such as water-driven motors or other hydraulic motors can also be used. With boom 30 mainly closed, as in area 58, the motors on end support tower 21J may be driven continuously. This tends to create a stress on the joint between end segment 20J and adjacent section 20I above support tower 21I. When a certain amount of stress is sensed by a sensor (not shown) at the joint above tower 21I, the motors of adjacent support tower 21I are driven for a length of time to alleviate this stress. This method of control continues through adjacent segments and towers until the innermost support tower 21A is driven. Thus, the end support tower 21J can be driven continuously or as long as desired to obtain a given rate of speed, and each adjacent support tower is driven less as central point 12 is approached, with the innermost support tower 21A being driven least.

Boom support tower 31 has motor driven wheels 22 similar to those of support towers 21. These boom support wheels are activated or stopped according to a signal from a strain sensor (not shown) placed at joint 40. When main conduit 20 has moved forward and thereby created a stress at joint 40, support tower 31 is signalled to drive forward until the stress is alleviated. This can be accomplished by any sensor as desired. One such sensor includes an arm attached to boom 30 with a cam which is slidably connected to an arm attached to conduit 20. As conduit 20 is driven by tower 21J the cam slides along the main conduit arm, since the boom is not driven. At a predetermined point, in one direction, the cam triggers a signal which drives boom support tower 31, causing the cam to slide the opposite way along the main conduit arm. When the cam slides beyond a second predetermined point, in the opposite direction, the motors on boom support tower 31 are shut off. The sensor may also afford a complete shut off of all towers, as a safety precaution, for a given excess stress condition at the joint between the boom and the main conduit.

Alternatively, the motors for boom support tower 31 can be driven continuously and the strain signal at joint 40 utilized to drive support tower 21J to alleviate stress. In other words, support tower 21J or boom support tower 31 can be driven as desired, with all the other towers following accordingly. In either case, it is only necessary to program the motors of one support tower to thereby control the movement of main conduit 20 and boom 30.

Boom support tower 31 includes motorized wheels 22 connected by axles 22A to wheel shafts 42 and 44 which rotate to allow wheels 22 to change direction. Tower 31 also includes wheel shaft supports 42A, 42B, and 42C and 44A, 44B, and 44C which are connected through suitable bearings in 42C and 44C to wheel shafts 42 and 44 to allow the wheel shaft to turn. Support tower 31 also includes a support beam 35 and support braces 36 which are attached to boom 30 and support it rigidly. Beam 35 is supported by bearings connected to wheel shafts 42 and 44. Support beam 35 is attached to the extension boom 30 at an angle of approximately 70° (Angle A, FIG. 3) so that when boom 30 is at its maximum extension, support beam 35 is essentially perpendicular to a radius drawn from center point 12 and the boom wheels 22 are thus aligned along a line perpendicular to the radius from point 12. This relationship to a radius from center 12 allows wheels 22 of boom support tower 31 to track in the same path each time around the field.

Boom support tower 31 is steered so that it follows buried wire 13 and thereby modifies the area to be irrigated by system 10. This is accomplished by a coupler sensor means 41 which is attached to boom 30 and field-coupled to buried electrical conductor 13. The sensor 41 signals the steering mechanism of the boom tower 31 so that the tower follows the buried electrical conductor 13. A type of control that can be utilized for sensor means 41 is shown in U.S. Pat. No. 3,468,391 to Rushing et al, for use with tractors.

Figure 3:
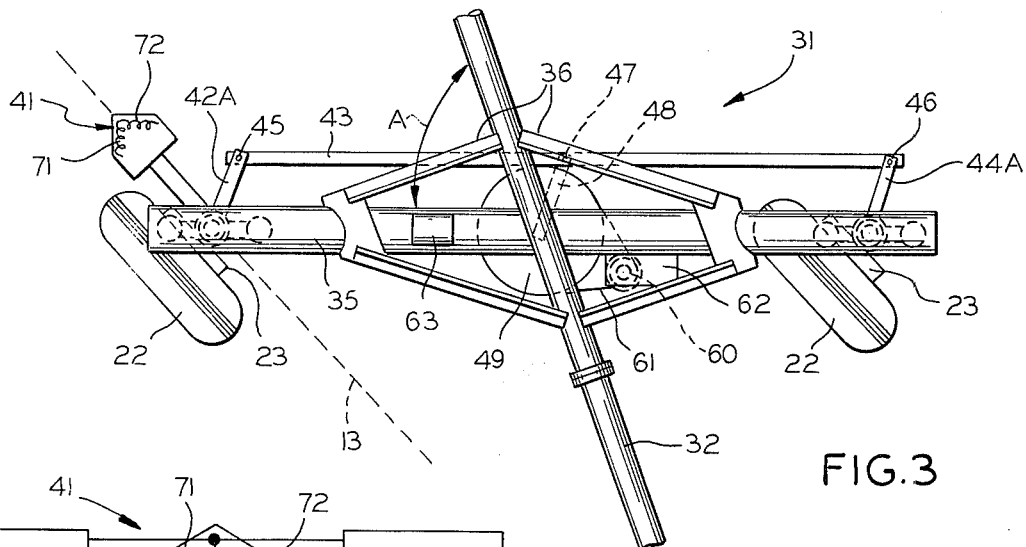
FIG. 3 is a plan view of a boom support tower constructed in accordance with one embodiment of the present invention.
Figure 4:
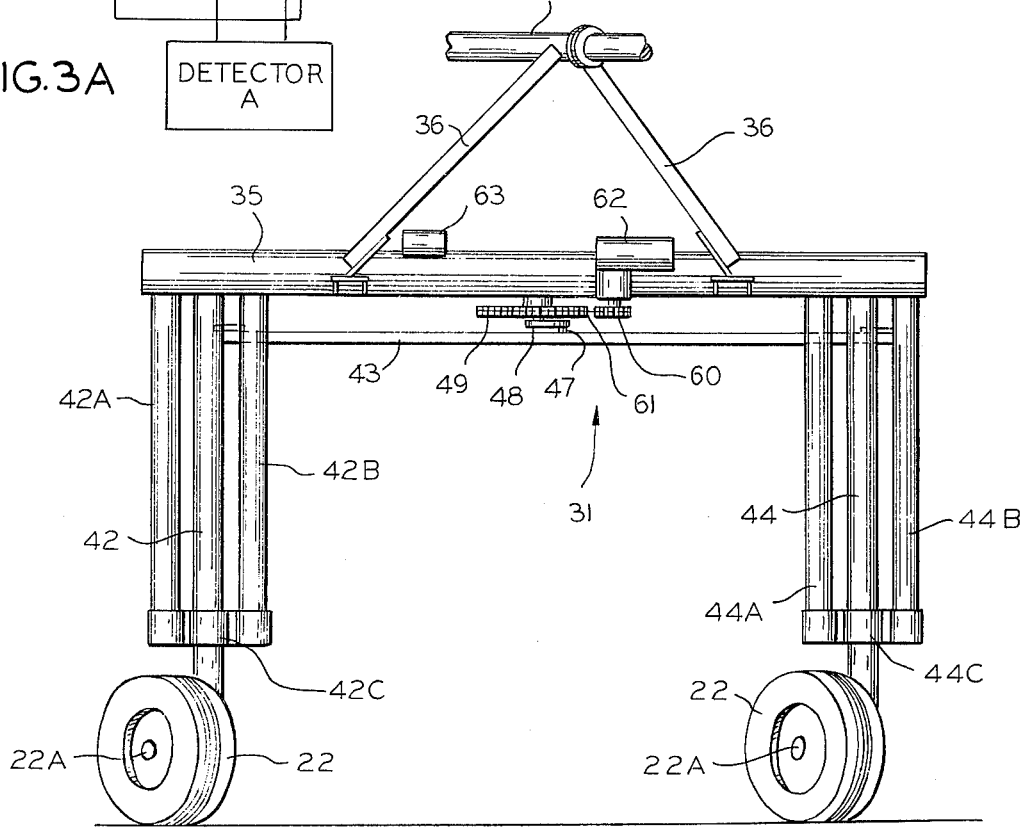
FIG. 4 is an elevation view of the boom support tower of FIG. 3.

In one embodiment shown in FIGS. 3 and 4, coupler sensor 41 is attached to wheel shaft 42, which turns as wheel 22 changes direction. A steering rod 43 connects wheel shaft 42 to the other wheel shaft 44 by pivot connections 45 and 46 to steering arms 42A and 44A which are connected to wheel shafts 42 and 44 respectively and also turn as the wheels and wheel shafts change direction. Steering rod 43 has another pivotal connection 47 to a steering drive arm 48 which is firmly affixed to a steering sprocket 49. Steering sprocket 49 is connected to a drive sprocket 60 by a drive chain 61. Drive sprocket 60 is driven by a motor 62 which is controlled by a control relay 63. Coupler sensor 41 senses when it strays from conductor 13 and signals control relay 63. Control relay 63 activates motor 62 which drives steering sprocket 49 and arm 48 to turn wheel shafts 42 and 43 and coupler sensor 41 toward conductor 13.

Figure 3A:
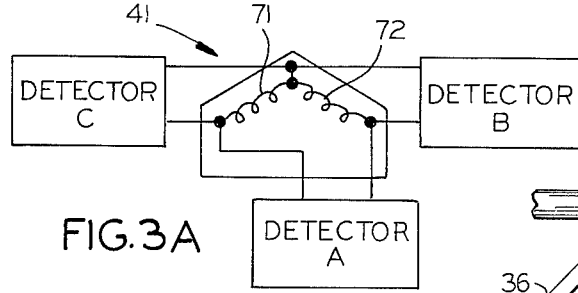
FIG. 3A is a schematic view of a sensor coupler of FIG. 3.

Coupler sensor 41 can simply be a pair of angularly disposed coils 71 and 72 electrically connected in a detector circuit in series opposing relation. Signal voltages are induced in the coils as the coils move through the electromagnetic field around conductor 13, the field being developed by a signal applied to the conductor from signal source 15. A constant frequency signal may be supplied to conductor 13. The coils are physically positioned so that the combined voltage across the coils is at a null when the coils in sensor 41 are centered above conductor 13. In all other positions, an unbalanced voltage output having a positive or negative phase angle will appear, the amplitude of the voltage depending on the proximity of the sensor 41 and the coils to the conductor 13 and the phase sign depending on the direction of imbalance. This positive or negative phase output is detected by detector A as seen in FIG. 3A and used to actuate a relay 63 to drive motor 62 to turn wheels 22 left or right as required.

The amplitude of the signal induced in the individual sensor coils will decrease as sensor 41 is separated from the conductor 13. When the voltage in the individual coils falls below a predetermined value, as sensed by detectors B and C, FIG. 3A, a signal to a fail-safe unit stops the operation of irrigation system 10. For example, system 10 can be designed so that if sensor 41 strays more than four feet from conductor 13, the fail-safe unit will interrupt the electric power and water supplies to irrigation system 10 and signal a remote control panel.

Although the preferred position of sensor 41 is alongside a wheel on a shaft which turns as the wheel changes directions, the sensor can be attached at the end of boom 30 near the ground and mechanically connected to follow changes in direction of the wheel shaft or steering linkage which allows the conductor to be buried at the desired maximum physical extension of system 10. Sensor 41 could also follow a conductor above the ground, such as a fence located beyond the end of boom 30.

Figure 5:
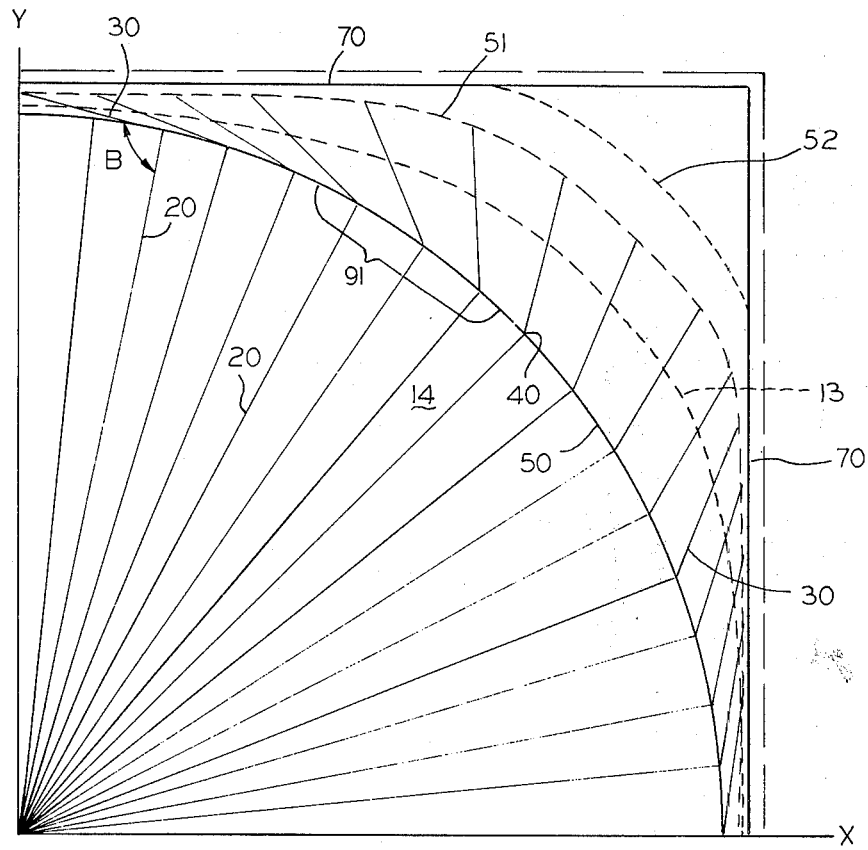
FIG. 5 is a schematic view of an embodiment of the present invention utilizing a buried wire control to irrigate a corner of a square field.
Figure 6:
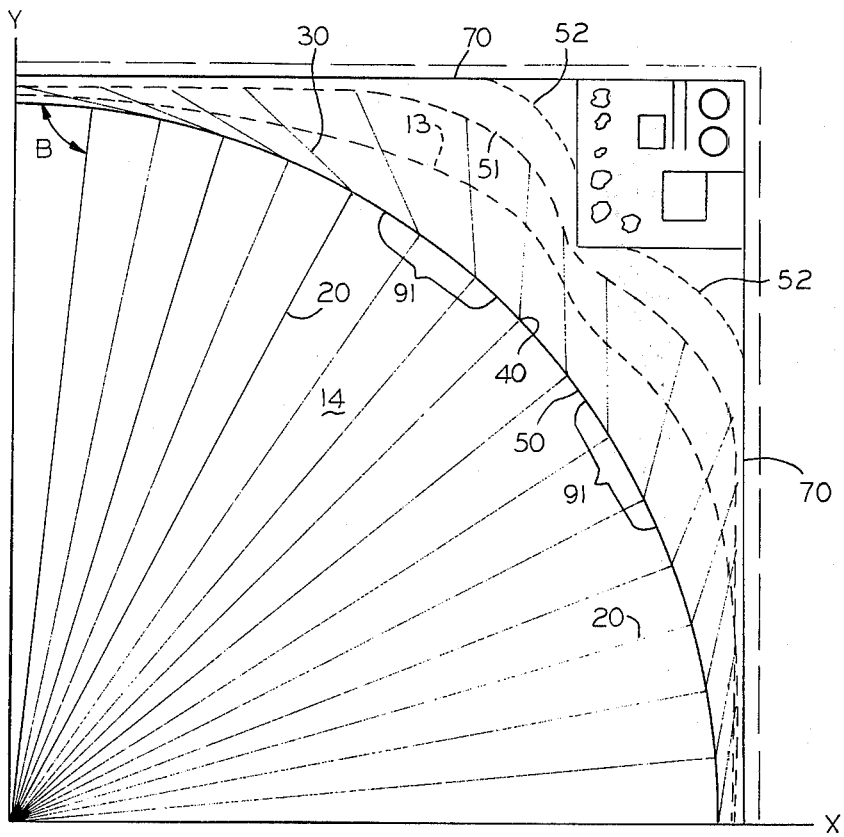
FIG. 6 is a schematic view of an embodiment of the present invention utilizing buried wire control to irrigate around an obstruction.

Turning to FIGS. 5 and 6, detailed schematics showing the position of main conduit 20 and boom 30 at various points during traversal of a square corner and an obstructed portion of a field are shown. The location of the buried conductor 13 is shown, as well as the outer circumference 50 of the travel of main conduit 20. Also, the extension 51 of the boom 30 is shown and the maximum coverage of irrigation is shown by line 52. The field 14 is shown by line 70. In an example of a preferred embodiment, boom 30 describes an angle B of more than 90° between it and the main conduit 20. Note that, in the area 91, boom 30 is not being extended as rapidly as possible; this is done to avoid undue stress on joint 40. The smoother the curves formed by conductor 13 around obstructions or into the corners are, the less stress will be placed on joint 40.

In a preferred mode of operation, end support tower 21J is the master drive unit for the system. Its motors are driven in accordance with a fixed duty cycle dependent upon the water balance requirements of the field, which may be a continuous duty cycle, while boom 30 is not being extended, and are driven at slower rates or in an intermittent manner while boom 30 is being extended. This is easily accomplished by an intermittent sensor at joint 40, which turns off the motors of end tower 21J for a period of time for every five feet or similar distance that the end of boom 30 extends from the center point 12. This allows a reduced rate of travel for tower 21J when aligned with the corner of the field while still permitting use of an inexpensive constant-speed motor for the tower.

Conversely, the boom tower 31 may be used as the motor drive unit instead of the tower 21J. Thus, the boom support tower can be propelled around the field pursuant to a predetermined duty cycle, with all other support towers controlled accordingly.

While the use of the system 10 has been described for irrigation, it should be apparent that the water source can be modified to include insecticides, fertilizers, or other crop additives as desired. It should also be observed that while the mechanically preferred position of the boom 30 is limited to an angle B, with the main conduit 20, of more than 90° and less than 180°, it would be possible to have the boom travel ahead of the main conduit if desired. It would also be possible to have the boom extend closer to the main conduit than 90°, especially in a field where the maximum size circle enclosed would be equal to one with a radius of main conduit 20.

We claim:

1. A center-pivot irrigation system for use with a water source connected to a central water supply point and an electrical conductor generating a field and defining a path related to the configuration of the area to be irrigated, comprising:

an elongated main water conduit communicating with the water source and projecting radially outwardly from the central point, the main water conduit being mounted on and extending between a series of propelled support towers located at spaced points along the main conduit and pivotally movable about the central point;

a boom, comprising at least one self-propelled steerable boom support tower and an auxiliary water conduit supported thereon, the auxiliary water conduit communicating with the main water conduit and being pivotally connected to the end of the main water conduit opposite the central point;

a plurality of sprinkler heads communicating with and located at spaced points along the main water conduit and said auxiliary water conduit;

sensing means mounted on the boom and field-coupled to the electrical conductor; and control means, coupled to the sensing means and coupled to the boom support tower, for guiding the boom support tower and the boom along the path defined by the electrical conductor.

2. A center-pivot irrigation system as in claim 1 wherein the control means is electrically connected to the sensing means.

3. A center-pivot irrigating system as in claim 1 wherein, at the maximum extension of the boom, the wheels of the boom support tower are aligned along a line essentially perpendicular to a radius drawn through the central point so that the wheels of the boom support tower move along the same track each time around the field.

4. A center-pivot irrigation system as in claim 3 in which the auxiliary water conduit support tower is connected to the boom at an angle of approximately 70°.

5. A center-pivot irrigation system as in claim 1 wherein the boom support tower includes a steerable wheel and an associated wheel shaft and wherein the sensing means is attached to the wheel shaft, which turns as the wheel changes directions.

6. A center-pivot irrigation system as in claim 1 wherein the end support tower of the main water conduit is propelled as desired and the drive controls for all other support towers and boom support towers are made dependent thereon.

7. A center-pivot irrigation system as in claim 6 wherein the end support tower of the main water conduit is driven in accordance with a duty cycle determined by water balance requirements of the field, except for periods determined by a sensor at the joint between the main water conduit and the boom, whereby movement of the end support tower is interrupted in accordance with movements of the boom from the central point and in accordance with stress on the connection of the boom to the main water conduit.

8. A center-pivot irrigation system as in claim 1, wherein one boom support tower is propelled as desired and the drive controls for all other support towers are made dependent thereon.

9. A boom for use with a center-pivot irrigation system connected to a water source at a central water supply point, an electrical conductor generating a field and defining a path related to the configuration of the area to be irrigated, an elongated main water conduit communicating with the water source and projecting radially outwardly from the central point, the main water conduit being mounted on and extending between a series of self-propelled support towers located at spaced points along the main conduit and pivotally movable about the central point, and a plurality of sprinkler heads communicating with and located at spaced points along said main water conduit, comprising:

at least one self-propelled, steerable boom support tower;

an auxiliary water conduit communicating with the main water conduit and supported on the boom support tower, the auxiliary water conduit being pivotally connected to the end of the main water conduit opposite the central point, a plurality of sprinkler heads communicating with and located at spaced points along the auxiliary water conduit;

sensing means mounted on the boom support tower and field-coupled to the electrical conductor; and, control means electrically coupled to the sensing means and coupled to the boom support tower for guiding the boom support tower and the boom along the path defined by the electrical conductor.

10. A boom as in claim 7 wherein the outermost boom support tower includes a steerable wheel and an associated wheel shaft, and wherein the sensing means is attached to the wheel shaft of the outermost boom support tower, which turns as the wheel changes directions.

11. A boom as in claim 9 wherein, at the maximum extension of the boom, the wheels of the boom support tower are aligned along a line essentially perpendicular to a radius drawn through the central point so that the wheels of the boom support tower move along the same track each time around the field.

* * * * *

UNITED STATES PATENT OFFICE
CERTIFICATE OF CORRECTION

Patent No. 3,902,668          Dated September 2, 1975

Inventor(s) Daugherty, Robert B., & Eaton, William C.

It is certified that error appears in the above-identified patent and that said Letters Patent are hereby corrected as shown below:

Column 8, line 21, substitute --9-- in place of "7".

Signed and Sealed this

Twenty-sixth Day of February 1980

[SEAL]

Attest:

SIDNEY A. DIAMOND

Attesting Officer          Commissioner of Patents and Trademarks